Garland P. Peed, Jr.
INVENTOR.

BY [signature] James M. Clark
ATTORNEY.

March 13, 1956  G. P. PEED, JR  2,738,149
CONTROL LOCK MECHANISM
Filed Nov. 2, 1954  3 Sheets-Sheet 2

Garland P. Peed, Jr.
INVENTOR.

BY *James M. Clark*

ATTORNEY.

March 13, 1956 G. P. PEED, JR 2,738,149
CONTROL LOCK MECHANISM
Filed Nov. 2, 1954 3 Sheets-Sheet 3

Garland P. Peed, Jr.
INVENTOR.

BY *James M. Clark*
ATTORNEY.

United States Patent Office 2,738,149
Patented Mar. 13, 1956

2,738,149

CONTROL LOCK MECHANISM

Garland P. Peed, Jr., Pacific Palisades, Calif., assignor to North American Aviation, Inc.

Application November 2, 1954, Serial No. 466,271

8 Claims. (Cl. 244—85)

This invention relates generally to control lock mechanisms and more particularly to improved locking mechanisms for hydraulic boost systems having emergency manual control provisions.

In many control systems there frequently is provided a hydraulic power or boost control for a movable member or other control instrumentality and in addition thereto, for use at such time as the boost system may be inoperative, there is preferably also provided a direct manual control for the operation of the same movable member. The improved locking mechanism of the present invention is particularly applicable to such combined boost and manual system in aircraft wherein, upon failure of the boost system due to loss of boost pressure or from other causes, the manually controlled system may be rapidly and selectively locked to the pilot control to eliminate any lost-motion which would normally occur upon loss of boost pressure. This invention is directed to improved means for selectively locking together a drive element, such as a sheave, to a coaxially mounted driven element for the direct control of the manual portion of the system upon failure of the hydraulic boost portion. While the present invention is particularly applicable to such controls for aircraft it is not limited thereto but has wide and general application to all such installations where selective locking is desirable.

In control systems of the type in which the present control lock is applicable, it is customary practice to allow free motion, particularly in aircraft control systems, such free motion being desirable to allow the operator to actuate the power metering control, in this case the hydraulic boost valve, in order to direct power to the unit being controlled. It is also customery, particularly in the flight control systems of aircraft, to incorporate some mechanical stops, or limits in the controller mechanism. Such a limit is so designed as to constitute a mechanical coupling in case of power failure and thus furnish the operator a mechanical system for direct manual operation of the unit being controlled. In most prior installations, the limit functioned as a mechanical connector when the fluid metering unit was not operating, but in most such prior systems a certain amount of freedom or play occurs between the two opposite limits. Therefore, in such systems when the operator reverses the controls there is a period through the neutral position in which no connection occurs. In the case of hydraulic boost valves or other suitable metering units having long strokes in their operation, this area of no positive connection may become quite large at the operator's control stick or column. The present improved lock mechanism entirely eliminates this looseness or lost-motion, (which in certain aircraft has amounted to approximately three inches of play at the pilot's control stick) thereby providing a positively controlled system by securely locking the controller and the follow-up members together.

Other objects and advantages of the present invention will occur to those skilled in the art after reading the present description, taken in conjunction with the accompanying drawings, forming a part hereof, in which.

Figure 1:
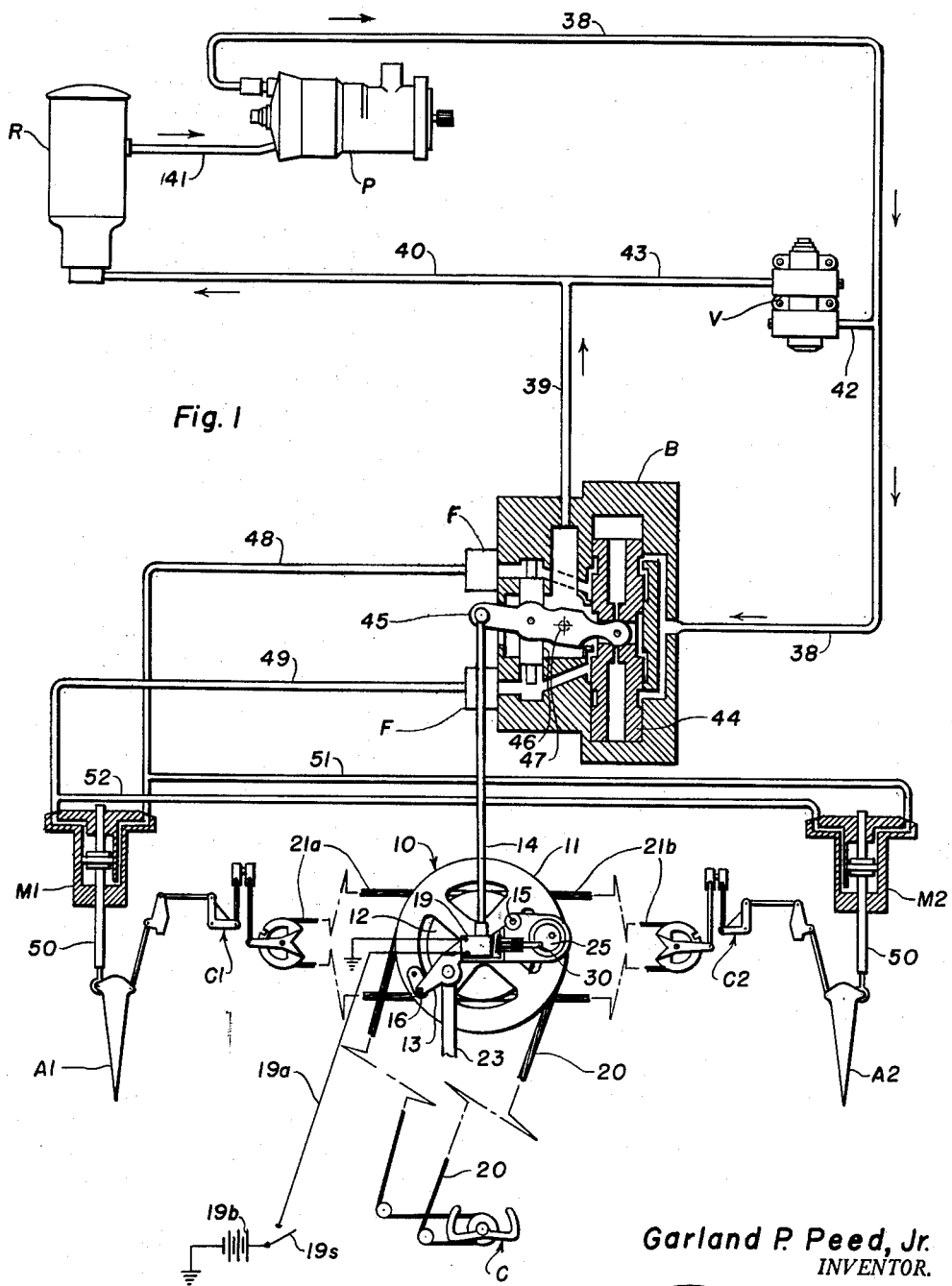
Fig. 1 is a diagrammatic view of the aileron control system of an aircraft in which both hydraulic boost and direct manual actuation is accomplished by the embodiment of a preferred form of the present locking mechanism.

Referring now to Fig. 1, the ailerons of the aircraft are indicated at A1 and A2 and the pilot control column indicated by the letter C. The pilot control C is connected as by the control cable 20 with the improved selective locking mechanism 10 which is comprised essentially of the driving sheave 11, the coaxially mounted driven sheave 12 and the torque arm 13 which is pivotally and adjustably mounted upon the drive sheave 11. Under normal operating conditions the ailerons A1 and A2 are actuated by the hydraulic boost control system by controlled movements of the rod 14 interconnecting the torque arm 13 with the hydraulic boost valve B. The latter is provided with hydraulic pressure from the power driven pump P which draws fluid from the reservoir R through the suction line 41, delivering the same through the pressure line 38 to the boost valve B from which the fluid is returned through the return lines 39 and 40 to the reservoir R. A pressure relief valve V may be installed across the supply and return lines 38 and 39, respectively, to bypass excessive pressures, being connected thereto by the conduits 42 and 43.

The boost control valve B consists of the main spool or slide valve element 44 which is pivotally connected to the valve actuating lever 45 pivoted to the valve body at 47 and which also actuates a secondary or "feel" producing piston 46. Displacement of the spool 44 directs hydraulic fluid to one or the other of the boost cylinders through the indicated port in a well-known manner. The boost control valve B is connected to the opposite sides of the fluid motors M1 and M2 as by the conduits 48 and 49 in the case of the motor M1, and by the conduits 51 and 52 for supplying hydraulic fluid to the motor M2. The pressure developed by the "feel" piston 46 is proportional to the work performed at the control surfaces by the boost cylinders. A centering spring (not shown) urges the spool member toward its neutral position. The outlets of the hydraulic boost valve B may preferably be provided with flow regulators F and the pistons of the motors M1 and M2 are suitably connected to the respective ailerons by the piston rods 50 such that they are differentially operated in the conventional manner upon movement of the push-pull rod 14.

Still referring to the diagrammatic showing in Fig. 1, the driven sheave 12 preferably has a double cable groove for engaging the control cables 21a and 21b which extend respectively to the aileron control mechanisms C1 and C2 to the left and right ailerons A1 and A2, respectively. These control cables 21a and 21b, as well as the control mechanisms C1 and C2 are arranged such that rotation of the sheave 12 in a given direction will impart downward deflection to one of the ailerons and opposite or upward deflection to the other. Both the foregoing hydraulic boost portion and the manual control portion of the present control system is conventional except for the improved means whereby the two sheaves or equivalent elements are selectively locked and the control movement transmitted from the torque arm 13 to the hydraulic boost valve B, or directly to the ailerons. While the elements 11 and 12 have been shown and described as cable sheaves, it will be understood that they may take the form of sectors or other pivotally mounted members with equally satisfactory results.

The torque arm 13 is pivotally connected to a supporting link or fitting 17 carried upon the drive sheave 11, the pivotal connection being made at the pivot 16 and the torque arm 13 is also pivotally connected to the driven sheave 12 by the pivot 15 mounted in the ball-bearing 15a. The selective locking between the sheaves is accomplished by the disc 25 rotatably journalled within the torque arm 13 and movable by the solenoid 19 having a connection 30 to the disc 25. The solenoid 19 may be energized from a suitable source of energy 19b controlled by the switch 19s and connected thereto by the wiring or leads 19a. Whereas the torque arm 13 normally controls the boost valve B for the control of the ailerons, this arm is also pivotally connected by the pivot 23a to a push-pull rod 23 which may be connected, through a suitable lost-motion connection (not shown), to an automatic pilot device for the automatic control of the ailerons in flight.

The improved lock unit 10 provides means for selectively securing in fixed relation the cable sectors or sheaves 11 and 12 which are normally interconnected through the torque reaction arm 13. Reference is now made to the remaining detailed figures for a clearer understanding of the arrangement of the locking mechanism and its operation. As previously indicated, the drive cable sheave or sector 11 is arranged to receive the control cables 20 from the aircraft cockpit within a groove about its perimeter and the cables may be suitably locked thereto by cable locks fitting within the notches 11a within the periphery of the sector. The driven sector or sheave 12 is interconnected with the drive sector or sheave 11 through the torque arm 13, connection being effected at the pivot 15 and, as shown in Fig. 1, the control cables 21a and 21b extend from this sector 12 to the right and left ailerons to provide manual emergency operation thereof. The torque arm 13 is also pivotally mounted at 16 upon the fitting 17 which is pivotally attached at 18 to the drive sheave 11. Rotation of the drive sheave 11 displaces arm 13 to which the aileron boost control valve B is connected through the push-pull rod 14, which in turn is pivotally connected to the torque arm 13 in the region of the common axis of rotation X—X of the assembly.

The boost control valve B operates in an open center hydraulic system and the greater the deflection of the torque arm 13 the greater the reaction of the valve B with a consequent proportional diversion of the hydraulic fluid to the fluid motors or boost cylinders at the ailerons. In the event of loss of boost pressure an undesirable condition arises wherein movement of the drive sheave or sector 11 results in free movement of the torque arm 13 owing to the elimination of the normal back pressure from the control valve B. This loss of boost pressure and the lost-motion in the torque arm 13 gives rise to play between the drive sheave 11 and the driven sheave 12 creating an undesirable effect for the pilot; but such lost motion in the present system when no boost is available is avoided by the use of the selectively controlled lock described herein.

Figure 2:
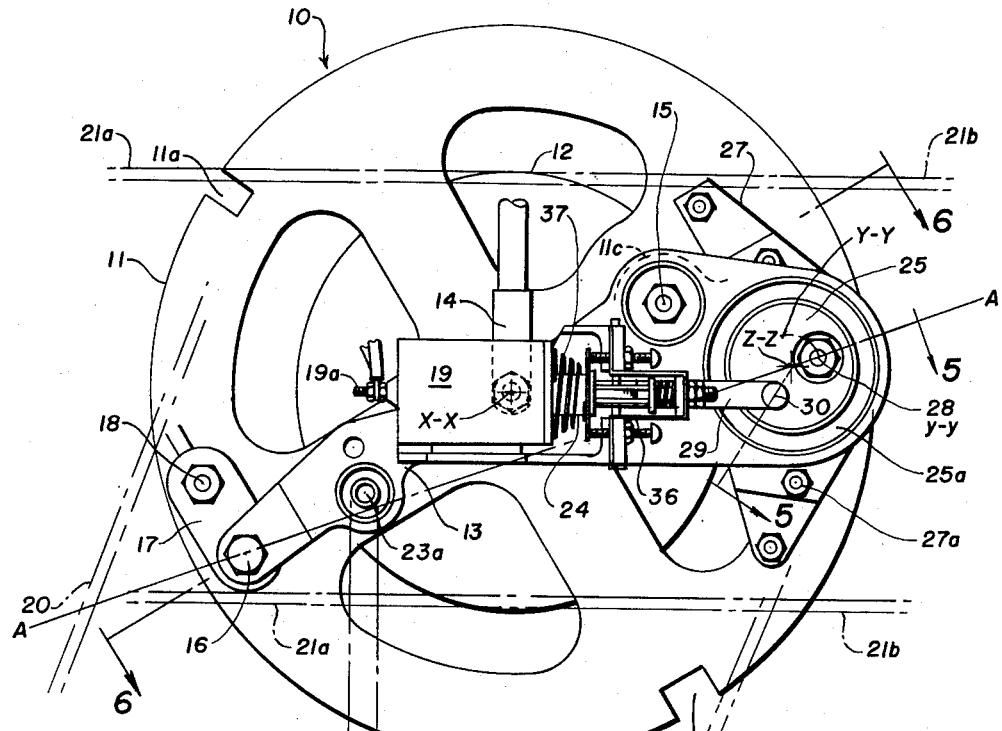
Fig. 2 is an enlarged view of the locking mechanism shown in Fig. 1, with the elements in the unlocked condition for hydraulic boost operation.
Figure 4:
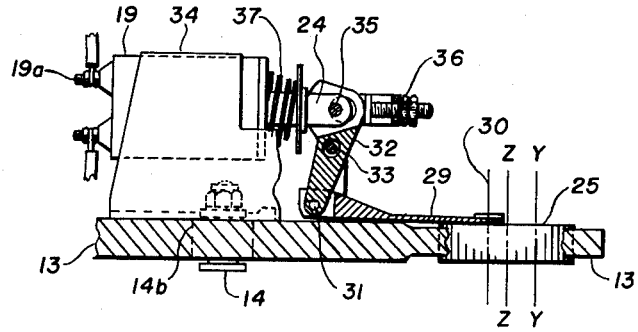
Fig. 4 is a detailed elevational view showing the mechanism whereby the selective locking is accomplished.
Figure 6:
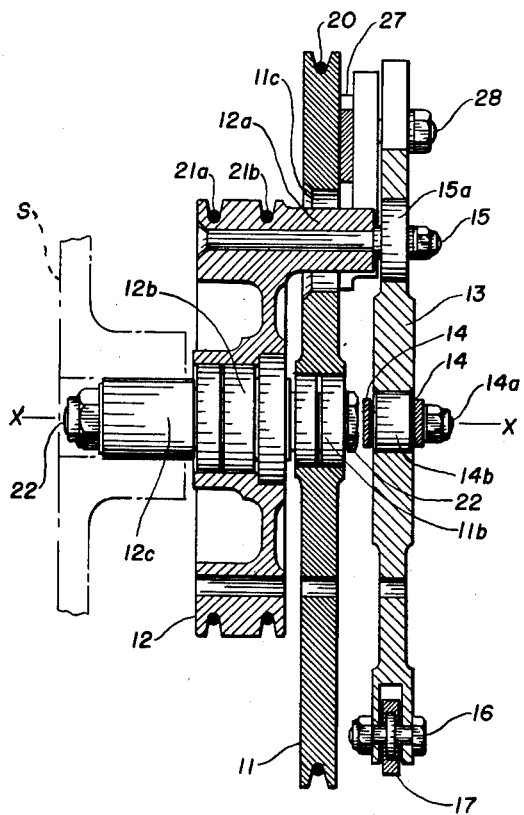
Fig. 6 is a cross-sectional view of the locking mechanism as taken along the lines 6—6 of Fig. 2.
Figure 5:
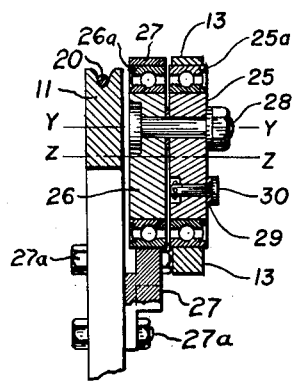
Fig. 5 is a cross-sectional view of the discs of the locking mechanism as taken along the lines 5—5 of Fig. 2.

This selective locking of the drive and driven sheaves is accomplished by an over center lock which is actuated by the electric solenoid 19 mounted upon the torque arm 13. The driven sheave 12 is pivotally interconnected at 15 to the torque arm 13 through the extension 12a on the sheave 12 which projects through a suitable opening 11c formed within the drive sheave 11 between the spoke portions thereof as more clearly shown in Fig. 6. The sheaves or sectors 11 and 12 are mounted for independent rotation about the common center or axis X—X of the main pivot pin 22 mounted within the support structure S and carrying the ball-bearings 11b, 12b and 12c. The torque arm 13 carries a ball-bearing mounted disc 25 journalled at 25a for free rotation therein and a corresponding disc 26 is concentrically journalled by the bearing 26a in the plate fitting 27 which is secured to the drive sector 11 as by the attachment bolts 27a. The discs 25 and 26 are pivotally interconnected by the pivot bolt 28 having an axis Y—Y. The plunger 24 of the solenoid 19 is connected to a link 29 which is pivotally attached at 30 to the disc 25. Normally, when the ailerons are operated by hydraulic boost control, the solenoid 19 is de-energized, the plunger 24 thereof is in the extended position and the disc 25 is positioned as shown in Fig. 2 in which the sheaves are in the unlocked relationship. In this position, the arm is free to transmit reaction forces from the sheave 11 through the fitting 14 to the boost control valve B and movement of the sheave 12 follows. The link 29 is pivotally connected at 31, as shown in Fig. 4, to the lever 32 which in turn is pivotally mounted at 33 upon the solenoid support member 34. The lever 32 is connected at the pivot 35 to the solenoid plunger 24 and a spring 37 is provided to return the plunger 24 when the solenoid 19 is deenergized. The throw or movement of the solenoid plunger 24 is adjusted by the mechanism shown at 36 in Fig. 4.

With the mechanism in the unlocked position as shown in Fig. 2, a line A—A projected through the centers of the pivot point 16 of the torque arm 13 and the connection 28, or axis Y—Y, of the discs 25 and 26 will also pass through the center Z—Z of the two concentric discs. In this unlocked position deflection of the torque arm 13 about the pivot 16 will result in a swinging movement of the disc 25 about the pivot 28, relative movement of the discs 25 and 26 being obtainable with respect to each other.

Figure 3:
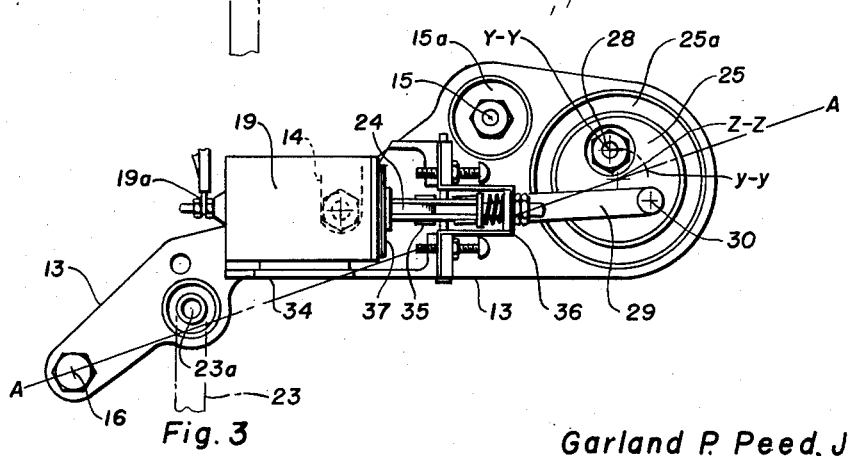
Fig. 3 is a similar view of a portion of the mechanism shown in Fig. 2, but with the same in the locked condition for direct manual operation.

When the solenoid 19 is energized the plunger 24 is drawn to the left and through the lever 32 and the link 29 it causes rotation of the discs 25 and 26, interconnected at the pivot 28, moving the center y—y counterclockwise 90° to a new yosition Y—Y as shown in Fig. 3. In this off center or eccentric position from the line A—A, no relative swinging movement of the discs 25 and 26 with respect to each other is possible. This selective locking movement of the discs to this position, in which the axis of the pivot 28 is moved from the aligned position at y—y to the offset or eccentric position Y—Y, provides a positive lock and prevents any deflection of the torque arm 13, resulting in the direct transmission of manual control movements of the sheave 11 to the sheave 12, eliminating all lost-motion in the control system. The torque arm 13 is attached to the sector 11 through the intermediate plate link 27 to avoid the possibility of a dead-center condition occurring for the torque arm 13.

While the present improved locking mechanism has been shown and described in connection with the emergency manual operation of an aircraft control surface upon failure of the hydraulic system, it will be appreciated that the improved mechanism is not limited to such specific use but can be applied to the selective locking of any two coaxially mounted members wherever such locking is found desirable. Other forms and modifications of the present invention both with respect to the general arrangement and the specific details of its respective elements, are intended to come within the scope and spirit of this invention, as more particularly set forth in the appended claims.

I claim:

1. A locking mechanism comprising a manually controllable member, a driven member pivotally mounted coaxially with said controllable member, said driven member operatively connected to a movable component, power means operatively connected to said movable component, lever means pivotally mounted upon said controllable member, said lever means being operatively connected to said driven member, disc means separately mounted upon said controllable member and said lever means, pivot means operatively associated with said disc means, and means for selectively adjusting said disc means for the power actuation of said movable component from said lever means or manually from said driven member by the locking of said controllable member thereto.

2. A locking mechanism comprising a pivotally mounted manually controllable member, a normally free driven member pivotally mounted coaxially with said controllable member, said driven member operatively connected to a movable component, lever means pivotally mounted upon said controllable member, said lever means having a pivotal connection to said driven member, disc means separately rotatively mounted upon said controllable member and said lever means, pivot means operatively associated with said disc means, and means for selectively adjusting said disc means about said pivot means for the manual actuation of said movable component by the locking of said controllable member to said driven member through said lever means and said disc means.

3. In a control system having a controllable member; a hydraulic boost control including a hydraulic boost control valve operatively connected to said controllable member; a manual control member; a drive member operatively connected to said manual control member; torque means mounted upon said drive member; operating means connecting said torque means with said hydraulic boost control valve for the actuation of said control surface upon manual movement of said manual control member, said drive member, said torque arm and said operating connection; a secondary member pivotally mounted in a coaxial relationship with said drive member and operatively connected to said controllable member; a lost-motion connection operatively associated with said torque means and said secondary member permitting relative freedom of pivotal movement between said drive member and said secondary member when said boost valve is operated; and selective means for changing the mounting of said torque means upon said drive member for positively locking said drive member to said secondary member for the direct manual control of said controllable member from said manual control member.

4. In an aircraft control system having a control surface movably mounted upon the aircraft structure, a hydraulic boost control including a boost control valve operatively connected to said control surface, a pilot control member, a drive member pivotally mounted upon the aircraft and operatively connected to said pilot control member, a torque arm adjustably mounted upon said drive member, operating means connecting said torque arm with said hydraulic boost valve for the actuation of control surface upon pilot movement of said pilot control member, a secondary member pivotally mounted in a coaxial relationship with said drive member and operatively connected to said control surface, a lost-motion connection operatively associated with said torque arm and said secondary member permitting relative freedom of pivotal movement between said drive member and said secondary member when said boost valve is operated and selective means for changing the adjustable mounting of said torque arm upon said drive member and the closing of said lost-motion connection for positively locking said drive member to said secondary member for the direct manual control of said control surface by said pilot control member.

5. In an aircraft control system having a control surface movably mounted upon the aircraft structure, a hydraulic boost system including a boost control valve operatively connected to said control surface, a pilot control member, a drive member pivotally mounted upon the aircraft and operatively connected to said pilot control member, a torque arm adjustably mounted upon said drive member, operating means connecting said torque arm with said hydraulic boost valve for the actuation of said control surface upon pilot movement of said pilot control member, said drive member, said torque arm and said operating connection, a secondary member pivotally mounted in a coaxial relationship with said drive member and operatively connected to said control surface, a lost-motion connection comprising a first disc operatively associated with said torque arm and a second disc operatively associated with said secondary member permitting relative freedom of pivotal movement between said drive member and said secondary member when said boost valve is operated and selective means for changing the adjustable mounting of said torque arm upon said drive member and the rotation of said discs for positively locking said drive member to said secondary member for the direct manual control of said control surface from said pilot control member.

6. In an aircraft control system having a control surface movably mounted upon the aircraft structure, a hydraulic boost system including a boost control valve operatively connected to said control surface, a pilot control member, a drive member pivotally mounted upon the aircraft and operatively connected to said pilot control member, a torque arm adjustably mounted upon said drive member, operating means connecting said torque arm with said hydraulic boost valve for the actuation of said control surface upon pilot movement of said pilot control member, said drive member, said torque arm and said operating connection, a secondary member pivotally mounted in a coaxial relationship with said drive member and operatively connected to said control surface, a lost-motion connection comprising a first disc operatively associated with said torque arm and a second disc operatively associated with said secondary member permitting relative freedom of pivotal movement between said drive member and said secondary member when said boost valve is operated for the power control of said control surface, selective means for changing the adjustable mounting of said torque arm upon said drive member and the rotation of said discs for positively locking said drive member to said secondary member for the direct manual control of said control surface from said pilot control member, and link means pivotally connecting said torque arm to an automatic pilot for the automatic control of said control surface.

7. A control system for the operation of a movable member comprising an operator control element, a source of hydraulic pressure, a hydraulic boost valve, operating means connecting said hydraulic pressure source and said hydraulic boost valve to said movable member for its normal hydraulic operation by said operator control element, and an emergency operating mechanism operatively connected to said movable member for its manual control and direct operation upon failure of said hydraulic pressure source, said mechanism comprising a pivotally mounted drive element operatively connected to said operator control element, a driven element coaxially mounted with respect to said drive element operatively connected to said movable member, and means including a pair of selectively rotatable locking discs pivotally connected to both said drive and driven elements and to said hydraulic boost valve selectively operable in an unlocked relationship of said drive element in respect to said driven element for the normal hydraulic power actuation of said boost valve or selectively operable in a locked relationship of said drive and driven elements for the emergency manual operation of said movable member through said driven element and its operative connection to said movable member.

8. A locking mechanism comprising a manually controllable member, a driven member pivotally mounted coaxially with respect to said controllable member, said driven member operatively connected to a movable component for the manual control thereof, torque means pivotally carried by said manually controllable member, power actuated means operatively connected to said torque means and to said movable component, said torque means operatively connected to said driven member through selectively operable locking means separately and rotatably mounted upon said controllable member and said torque means, and means for selectively adjusting said locking means in an unlocked relationship of said controllable member and said driven member for the power actuation of said movable component directly from said torque means or alternatively in a locked relationship of said controllable member and said driven member for the manual operation of said movable component directly from said driven member.

References Cited in the file of this patent

UNITED STATES PATENTS

| | | |
|---|---|---|
| 721,160 | Cunningham | Feb. 24, 1903 |
| 2,487,116 | Eaton | Nov. 8, 1949 |